United States Patent
Noldus

(10) Patent No.: US 9,065,837 B2
(45) Date of Patent: Jun. 23, 2015

(54) METHOD, SYSTEM AND NETWORK NODES FOR PERFORMING A SIP TRANSACTION IN A SESSION INITIATION PROTOCOL BASED COMMUNICATIONS NETWORK

(75) Inventor: Rogier August Caspar Joseph Noldus, Goirle (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 141 days.

(21) Appl. No.: 13/511,586

(22) PCT Filed: Nov. 26, 2009

(86) PCT No.: PCT/EP2009/065936
§ 371 (c)(1),
(2), (4) Date: Jul. 16, 2012

(87) PCT Pub. No.: WO2011/063844
PCT Pub. Date: Jun. 3, 2011

(65) Prior Publication Data
US 2012/0284414 A1 Nov. 8, 2012

(51) Int. Cl.
*G06F 15/16* (2006.01)
*H04L 29/06* (2006.01)

(52) U.S. Cl.
CPC .......... *H04L 65/105* (2013.01); *H04L 65/1006* (2013.01); *H04L 65/1016* (2013.01)

(58) Field of Classification Search
CPC .............. H04L 65/105; H04L 65/1006; H04L 65/1016
USPC .............. 709/227, 228; 340/2.8, 2.9; 370/431
See application file for complete search history.

(56) References Cited

U.S. PATENT DOCUMENTS

| | | | |
|---|---|---|---|
| 7,080,151 B1* | 7/2006 | Borella et al. | 709/230 |
| 7,343,398 B1* | 3/2008 | Lownsbrough | 709/218 |
| 7,844,851 B2* | 11/2010 | Cosmadopoulos et al. | 714/4.1 |
| 7,933,994 B1* | 4/2011 | Mangal et al. | 709/226 |
| 7,945,029 B1* | 5/2011 | Wageman | 379/88.25 |
| 2003/0072430 A1* | 4/2003 | Berranger | 379/210.01 |
| 2003/0204599 A1* | 10/2003 | Trossen et al. | 709/227 |

(Continued)

FOREIGN PATENT DOCUMENTS

FR 2 907 294 A1 4/2008
JP 2008027189 A * 2/2008

(Continued)

OTHER PUBLICATIONS http://www.voip-info.org/wiki/view/SIP+redirect+server.*

(Continued)

*Primary Examiner* — Kostas Katsikis
(74) *Attorney, Agent, or Firm* — Coats & Bennett, PLLC

(57) ABSTRACT

Method, system and network nodes for performing a SIP transaction, such as a SIP Invite transaction, in a Session Initiation Protocol based communications network from a first node to a third node via a second node. The second node acts as a proxy that receives a SIP message from the first node and, instead of forwarding the message to the third node, transmits a pivot request to the first node requesting the first node to forward the message directly to the third node. The first node forwards the message directly to the third node, and during the remainder of the SIP transaction further SIP messages are exchanged between the first and third node directly.

16 Claims, 2 Drawing Sheets

(56) References Cited

U.S. PATENT DOCUMENTS

| | | | |
|---|---|---|---|
| 2003/0229718 A1* | 12/2003 | Tock et al. | 709/246 |
| 2004/0015589 A1* | 1/2004 | Isozu | 709/227 |
| 2004/0228352 A1* | 11/2004 | Constantinof | 370/395.21 |
| 2006/0013147 A1* | 1/2006 | Terpstra et al. | 370/252 |
| 2007/0047516 A1* | 3/2007 | Kottilingal | 370/352 |
| 2007/0064684 A1* | 3/2007 | Kottilingal | 370/355 |
| 2007/0100981 A1* | 5/2007 | Adamczyk et al. | 709/223 |
| 2007/0121890 A1* | 5/2007 | Li et al. | 379/221.13 |
| 2007/0133465 A1* | 6/2007 | Promenzio et al. | 370/331 |
| 2007/0153813 A1* | 7/2007 | Terpstra et al. | 370/401 |
| 2007/0291734 A1* | 12/2007 | Bhatia et al. | 370/352 |
| 2008/0077657 A1* | 3/2008 | Tagami et al. | 709/203 |
| 2008/0090569 A1* | 4/2008 | Khan et al. | 455/435.1 |
| 2008/0092226 A1* | 4/2008 | Horvath et al. | 726/12 |
| 2008/0098121 A1* | 4/2008 | Wu | 709/229 |
| 2008/0162637 A1* | 7/2008 | Adamczyk et al. | 709/204 |
| 2008/0304510 A1* | 12/2008 | Qu | 370/463 |
| 2008/0310312 A1* | 12/2008 | Acharya et al. | 370/241 |
| 2008/0313348 A1* | 12/2008 | Morris et al. | 709/239 |
| 2009/0310484 A1* | 12/2009 | Sisalem et al. | 370/230 |
| 2010/0293407 A1* | 11/2010 | Locasto et al. | 714/2 |
| 2010/0312896 A1* | 12/2010 | Ait-Ameur et al. | 709/227 |
| 2011/0029812 A1* | 2/2011 | Lu et al. | 714/18 |
| 2011/0131318 A1* | 6/2011 | Maes | 709/224 |
| 2011/0225307 A1* | 9/2011 | George et al. | 709/227 |
| 2012/0102205 A1* | 4/2012 | Tanimoto | 709/227 |
| 2012/0124222 A1* | 5/2012 | Noldus et al. | 709/227 |

FOREIGN PATENT DOCUMENTS

| | | | | |
|---|---|---|---|---|
| WO | 2004/075507 A2 | | 9/2004 | |
| WO | WO 2008001247 A2 | * | 1/2008 | H04L 29/06 |
| WO | WO 2010133237 A1 | * | 11/2010 | H04L 29/06 |
| WO | WO 2011020494 A1 | * | 2/2011 | |
| WO | WO 2011047720 A1 | * | 4/2011 | |

OTHER PUBLICATIONS http://www.dialogic.com/webhelp/bordernet2020/1.0.0/webhelp/sip_redirect.htm.*

Cheng et al., "Reducing idle mode power consumption of cellular/VoWLAN dual mode mobiles," Global Telecommunications Conference, 2005. GLOBECOM '05. IEEE , vol. 5, No., pp. 5 pp. 2906, Dec. 2-2, 2005 doi: 10.1109/GLOCOM.2005.1578289.*

Subramanian et al., "Comparative Study of M/M/1 and M/D/1 Models of a SIP Proxy Server," Telecommunication Networks and Applications Conference, 2008. ATNAC 2008. Australasian , vol., No., pp. 397,402, Dec. 7-10, 2008 doi: 10.1109/ATNAC.2008.4783357.*

Rosenberg, J., et al. "SIP: Session Initiation Protocol" Jun. 1, 2002. pp. 1-269. The Internet Society, Geneva, Switzerland.

Rosenberg, J. "Applying Loose Routing to Session Initiation Protocol (SIP) User Agents (UA)" IETF Standard-Working-Draft. Jan. 25, 2008.

* cited by examiner

METHOD, SYSTEM AND NETWORK NODES FOR PERFORMING A SIP TRANSACTION IN A SESSION INITIATION PROTOCOL BASED COMMUNICATIONS NETWORK

TECHNICAL FIELD

The invention relates to transfer of a message in a Session Initiation Protocol (SIP) based communications network in general. The invention relates to a method, system and network nodes for performing a SIP transaction in a Session Initiation Protocol based communications network. More in particular the invention relates to a Voice over Internet Protocol (VoIP) network, e.g. implemented as an Internet Protocol (IP) Multimedia Subsystem (IMS) network.

BACKGROUND

In a Session Initiation Protocol (SIP) based communications network SIP transactions, such as SIP Invite transactions, are performed. According to known methods, these transactions generally include SIP messages being sent from a first node to a third node via a second node. For example during a SIP call, SIP messages may be transmitted from a User Agent (UA) via a Proxy Call Session Control Function (P-CSCF) entity to a Serving Call Session Control Function (S-CSCF) entity, from a P-CSCF via an S-CSCF entity to an Interrogating Call Session Control Function (I-CSCF) entity, or from a first S-CSCF entity via an I-CSCF entity to a second S-CSCF entity.

SUMMARY

It has been found that some proxies which participate in such Session Initiation Protocol (SIP) transaction are idle for a relatively large proportion of the duration of the transaction. There is, hence, an unnecessary claim on the resources of such proxies. This translates into an unnecessary load on the SIP based communications network.

It is therefore an object of the present invention to reduce the idle time of some proxies in a SIP based communications network. More in general it is an object of the invention to improve network efficiency in a SIP based communications network.

Thereto, according to the invention is provided a method of performing a SIP transaction, such as a SIP Invite transaction, in a Session Initiation Protocol based communications network from a first node to a third node via a second node, wherein the second node acts as a proxy that receives a SIP message from the first node and, instead of forwarding the message to the third node, transmits a request, herein referred to as pivot request, to the first node. Said pivot request may request the first node to take over responsibility of the transaction. Said pivot request may request the first node to forward the message to the third node, wherein the first node forwards the message to the third node in response to receiving said pivot request. During the remainder of the SIP transaction further SIP messages may be exchanged between the first and third node directly, i.e. without traversing the second node.

It has been found that in a SIP based communications network wherein SIP messages are being sent from a first node to a third node via a second node acting as a proxy, some second nodes involved in a basic SIP call need to act only on the forwarding of an initial SIP Invite request. These second nodes may add, remove, and/or modify a SIP header in the Invite request message or may modify the request-Universal Resource Identifier (URI). According to the prior art, these second nodes, e.g. proxies, must still remain in the SIP signaling for the entire SIP Invite transaction. This implies that these second nodes need to keep both a server transaction model instance and a client transaction model instance active for the duration of the Invite transaction, without asserting functional control over the Invite transaction. A node, i.e. a proxy, like an Interrogating Call Session Control Function (I-CSCF) entity needs to keep its service logic active unnecessarily; once the I-CSCF has forwarded the SIP Invite, it has no further functional control over the call. Hence, client and server state model instance for the Invite transaction are kept active unnecessarily long. There is, hence, unnecessary load on SIP nodes, such as proxy entities and SIP Application Servers (AS's), in the form of idle service logic instances and idle state model instances.

The invention alleviates this problem by having the second node, instead of forwarding the message towards the third node, requesting the first node to take responsibility of forwarding the message to the third node. The request to the first node to take responsibility is named a "pivot request" herein, as to designate the pivoting effect of this action regarding the remainder of the transaction being performed by the first node. Hence, the second node may refrain from remaining actively engaged in the SIP transaction. It will be appreciated that herein the first node may be any previous node that submitted a message towards the second node in order for the message to be forwarded to the third node. As such, one or more further network nodes may be present for forwarding the message from the first node to the second node, and for forwarding the pivot request from the second node to the first node.

Optionally, the pivot request includes information associated with the third node. The pivot request may e.g. include the network address of the third node. The pivot request may be designed to request the first node to modify the message prior to forwarding the message to the third node. The first node may be arranged to modify the message prior to forwarding. The first node may e.g. add, remove, and/or modify a SIP header in the Invite request message or may modify the request-Universal Resource Identifier (URI). Such addition, removal and/or modification may include using information obtained from the second node. The first node may modify the message prior to forwarding the message to the third node upon receiving the pivot request, optionally on the basis of information associated with the third node included in the pivot request.

Optionally, the first node indicates to the second node that it is arranged for receiving the pivot request and in response to the pivot request forwarding the message to the third node. The first node may also indicate to the second node that it is arranged for receiving the pivot request and in response to the pivot request taking over responsibility of the transaction. Preferably, the first node indicates so prior to receiving the pivot request from the second node.

Optionally, the Session Initiation Protocol based communications network is an Internet protocol Multimedia Subsystem communications network. Optionally the second node is an I-CSCF entity or Breakout Gateway Control Function (BGCF) entity. Optionally the first node acts as non-record routing proxy, as record routing proxy or as Back-to-Back User Agent (B2BUA), such as a P-CSCF entity, an S-CSCF entity or a SIP-AS.

Optionally, the SIP message is the initiating message of a SIP session, such as a SIP Invite request.

Optionally, the pivot request has the form of a 3xx response. Herein 3xx response means a SIP response having a status code value in the range 300-399.

The invention also relates to a system for performing a SIP transaction, such as a SIP Invite transaction, in a Session Initiation Protocol based communications network, the system comprising a first network node and a second network node, wherein the first network node is arranged for transmitting to the second network node a SIP message that is to be forwarded to a recipient node, wherein the second network node acts as a proxy arranged for receiving the SIP message from the first network node and is arranged for, instead of forwarding the message to the recipient node, transmitting a pivot request to the first network node requesting the first network node to take over responsibility of the transaction and to forward the message to the recipient node, wherein the first network node is arranged for forwarding the message to the recipient node in response to the pivot request, and wherein the first network node is arranged for transmitting further SIP messages to the recipient node and is arranged for receiving further SIP messages from the recipient node during the remainder of the SIP transaction. Herein the further messages do not traverse the second node.

The invention also relates to a first network node of this system. The invention also relates to a second network node of this system.

The invention also relates to a network node acting as a proxy for acting in a SIP transaction, such as a SIP Invite transaction, in a Session Initiation Protocol based communications network, wherein the network node is arranged for receiving from a sending node a SIP message that is to be forwarded to a recipient node, and is arranged for, instead of forwarding the message to the recipient node, transmitting a pivot request to the sending node requesting the sending node to forward the message to the recipient node. Herein the message forwarded by the sending node to the recipient node does not traverse the network node. Herein the pivot request may also request the sending node to take over responsibility of the transaction.

Optionally, the pivot request comprises information associated with the recipient node, e.g. as set out with respect to regular SIP routing methodology.

Optionally, said network node is an I-CSCF entity or BGCF entity.

Optionally, the SIP message is the initiating message of a SIP session, such as a SIP Invite request.

Optionally, the pivot request has the form of a 3xx response.

The invention also relates to a network node for acting in a SIP transaction, such as a SIP Invite transaction, in a Session Initiation Protocol based communications network, wherein the network node is arranged for transmitting to a forwarding node, e.g. acting as a proxy, a SIP message that is to be forwarded to a recipient node; receiving from the forwarding node a pivot request requesting the network node to forward the message to the recipient node; forwarding the message to the recipient node in response to the pivot request; and transmitting further SIP messages to the recipient node and receiving further SIP messages from the recipient node during the remainder of the SIP transaction. Herein the further SIP messages do not traverse the forwarding node. Herein the pivot request may also request the sending node to take over responsibility of the transaction.

Optionally, the pivot request comprises information associated with the recipient node, e.g. as set out with respect to regular SIP routing methodology.

Optionally, the network node is arranged for modifying the message prior to forwarding the message to the recipient node, optionally on the basis of the information associated with the recipient node, e.g. as set out with respect to regular SIP routing methodology.

Optionally, the network node is arranged for indicating to the forwarding node that the network node is arranged for receiving the pivot request and in response to the pivot request forwarding the message to the recipient node. The network node may also indicate to the forwarding node that the network node is arranged for taking over responsibility of the transaction in response to the pivot request. Optionally, the network node is arranged for indicating so prior to receiving the pivot request.

Optionally, the network node acts as non-record routing proxy, as record routing proxy entity or as B2BUA, such as a P-CSCF entity, an S-CSCF entity or a SIP-AS.

Optionally, the SIP message is the initiating message of a SIP session, such as a SIP Invite request.

Optionally, the pivot request has the form of a 3xx response.

BRIEF DESCRIPTION OF THE DRAWINGS

The invention will now be further elucidated by means of non-limiting examples referring to the drawings, in which.

DETAILED DESCRIPTION

The present invention relates to a method, system and network nodes for performing a Session Initiation Protocol (SIP) transaction, such as a SIP Invite transaction, in a SIP based communications network from a first node to a third node via a second node.

Herein the network nodes are sometimes also referred to as servers, or more specific indications, for example Interrogating Call Session Control Function entity, depending on their function within the network. A network node acting as a proxy herein is also referred to as a proxy.

The present invention proposes a method whereby a proxy applies 'pivot routing' for the onward routing of a SIP Invite or other SIP request message. When a SIP proxy that is processing a SIP Invite and that wants to forward the Invite to a next node, wherein information contained in the Invite is modified prior to forwarding by the proxy, the proxy may return a pivot route request to the previous, i.e. upstream, server. Herein the modification of the information may include modification of a Request-Universal Resource Identifier (R-URI) and/or modification of a SIP header, as appropriate for that proxy. Said pivot route request, which may have the form of a designated 3xx response, constitutes a request to said previous server to assume the responsibility of forwarding the SIP Invite, with modified information. Herein 3xx response means a SIP response having a status code value in the range 300-399. This modified information will correspond to the modified information that would otherwise be used by the SIP proxy itself, when it would not request the pivot routing.

The proxy may apply the pivot routing when the previous server had indicated that it supports such SIP pivot routing. A SIP server may indicate that it supports pivot routing when it will in any case act as non-record routing proxy, as record routing proxy or as Back-to-Back User Agent (B2BUA). A Proxy Call Session Control Function (P-CSCF) entity will typically act as B2BUA. A Serving Call Session Control Function (S-CSCF) entity would, strictly speaking, not have to apply record routing, since it is involved only in the onward routing of the Invite request. An Interrogating Call Session Control Function (I-CSCF) entity will normally not apply record routing.

Figure 1:
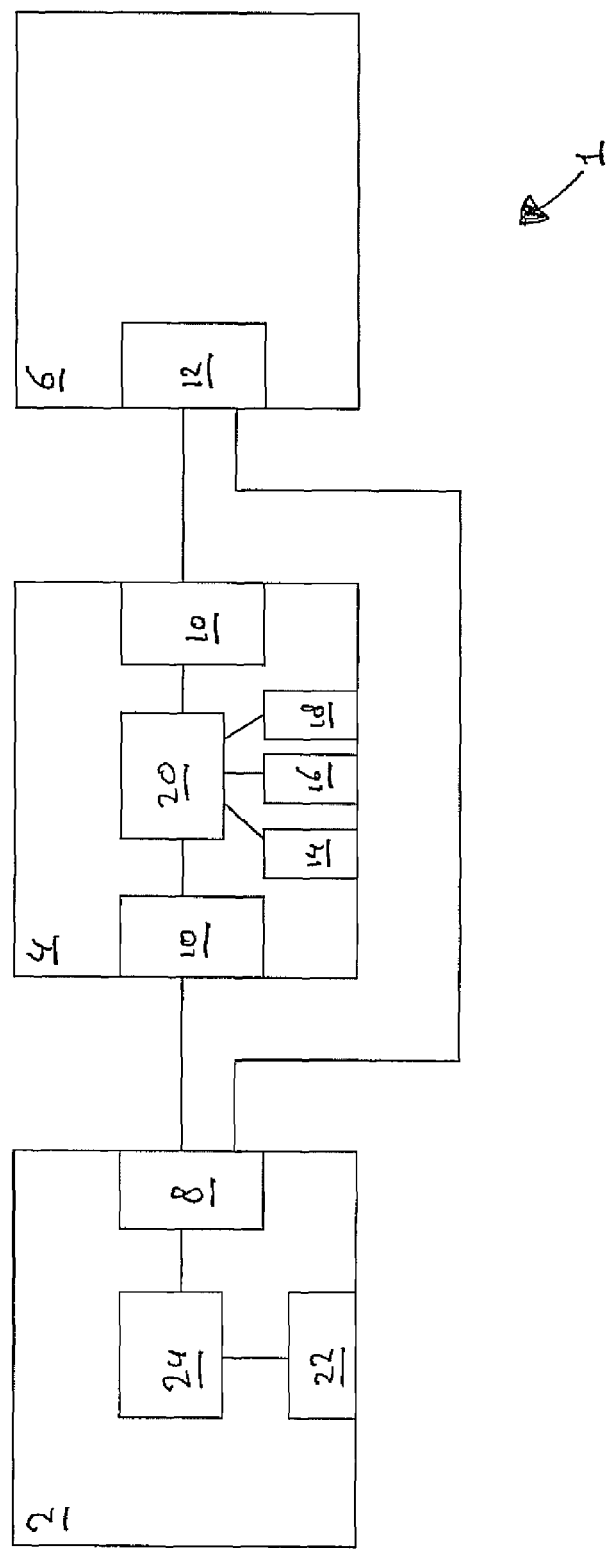
FIG. 1 shows a schematic representation of an example of a portion of a network according to the invention.

FIG. 1 shows a schematic representation of an example of system 1 forming a portion of a network according to the invention. In this example, the SIP based communications network is an Internet Protocol (IP) Multimedia Subsystem (IMS) communications network. In FIG. 1 the system 1 comprises a first S-CSCF entity 2, an I-CSCF entity 4 and a second S-CSCF entity 6.

In this example, when the I-CSCF entity 4 is processing a SIP Invite received from the first S-CSCF entity associated with an originating subscriber, herein also referred to as S-CSCF(A), and destined for the second S-CSCF entity 6 associated with a destination subscriber, referred to as S-CSCF(B), it may request pivot routing to the preceding S-CSCF entity 2. I.e. the I-CSCF entity 4 may request S-CSCF(A) to take responsibility of forwarding the Invite to S-CSCF(B) directly. The communication between S-CSCF (A) 2 and the I-CSCF 4 will be conducted using input/output units 8 and 10, respectively.

The I-CSCF entity comprises a repository 14 including information relating to the destination subscriber, such as for instance the network address of the S-CSCF(B) associated with the destination subscriber. The I-CSCF entity 4 comprises a determining unit 16 for determining which changes need to be made to the SIP Invite for allowing the SIP Invite to be forwarded to S-CSCF(B) 6. Such required changes may include 1. topmost route header, for routing to S-CSCF(B);
2. modified Request-URI, e.g. sip:URI transformed to tel: URI;

The I-CSCF entity 4 further comprises a synthesis unit 18 for including information representative of the required changes in a pivot request to be sent to S-CSCF(A) 2. In this example, the pivot request has the form of a 3xx response. It will be noted that the I-CSCF entity 4 in this example further comprises control unit 20 for controlling the input/output unit 10, the repository 14, the determining unit 16 and the synthesis unit 18.

S-CSCF(A) 2 will, when receiving the designated 3xx response, construct the required Invite, using a construction unit 22, and send the Invite to S-CSCF(B) directly using the input/output unit 8. S-CSCF(A) 2 uses its own address to set the Via header, so any response on this Invite request will be sent to S-CSCF(A) 2 directly. Thus, the I-CSCF entity 4 is in this example no longer participating in communication between S-CSCF(A) and S-CSCF(B) during this SIP transaction. It will be noted that S-CSCF(A) 2 in this example further comprises a control unit 24 for controlling the input/output unit 8 and for controlling the construction unit 22.

It will be appreciated that I-CSCF entities and S-CSCF entities are part of the Internet Protocol Multimedia Subsystem (IMS) core network and will typically be on the same software release, hence, both the I-CSCF entities and the S-CSCF entities may be easily prepared for applying pivot routing.

Figure 2:
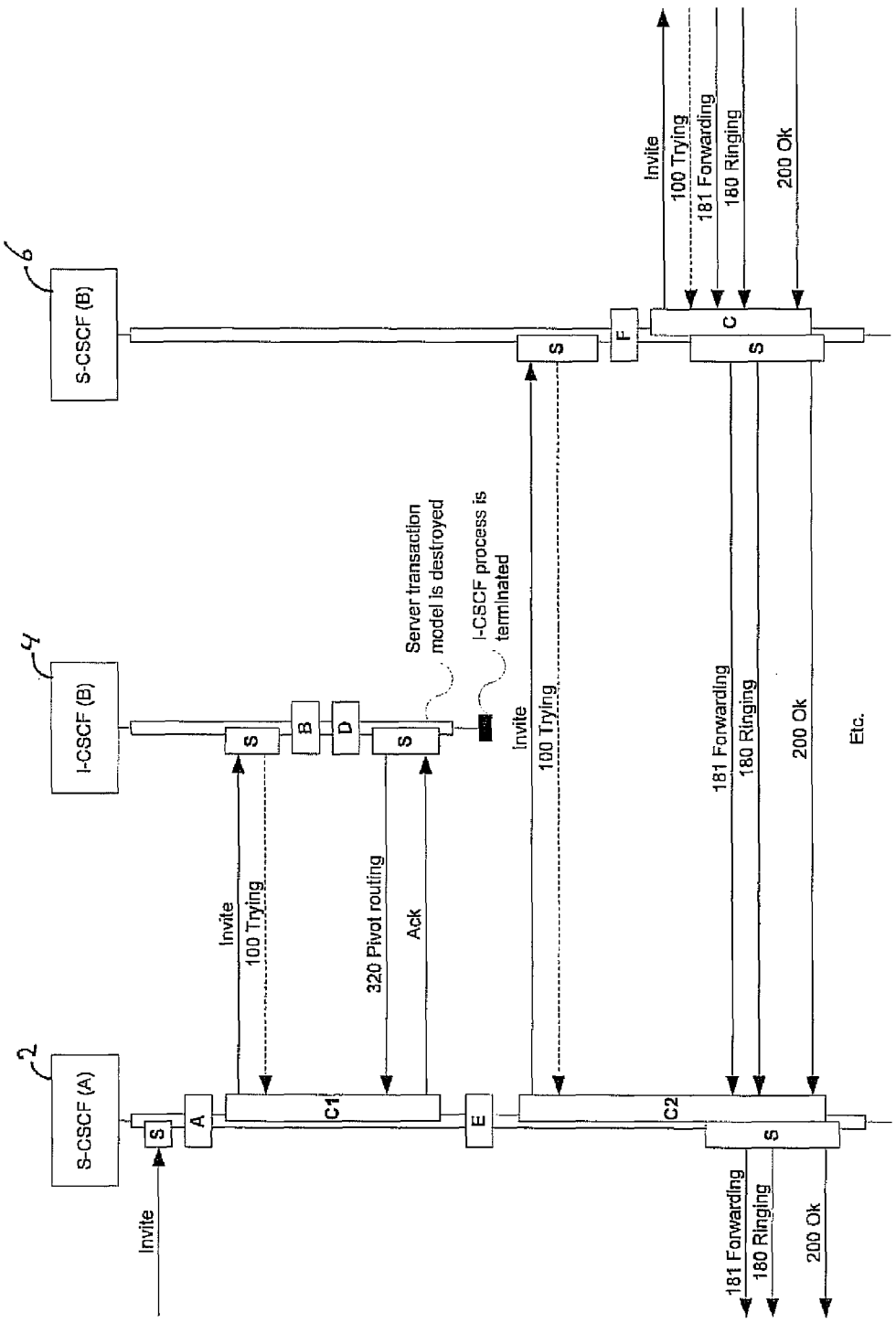
FIG. 2 shows an example of pivot routing between an S-CSCF entity and an I-CSCF entity.

FIG. 2 shows an example of pivot routing between an S-CSCF entity and an I-CSCF entity. In this example, S-CSCF(A) 2 receives an Invite request for which it will spawn an Invite server transaction model instance (S). This Invite request may come e.g. from a Session Initiation Protocol Application Server (SIP-AS), which returns the Invite over the IMS Service Control (ISC) reference point, in accordance with prior art. In task box A, S-CSCF(A) 2 takes the necessary steps for outbound routing, in accordance with prior art. The S-CSCF entity 2 determines, in addition, that the recipient of the Invite request, the I-CSCF entity 4, belongs to the same IMS network. S-CSCF(A) 2 includes the indication 'Pivot routing' in the Supported header in the Invite request, for example:

Supported: Pivot_routing

S-CSCF(A) 2 spawns an Invite client transaction model instance (C1) and sends the Invite request from that transaction model instance.

The I-CSCF entity 4, in this example, receives the Invite request for which it will spawn an Invite server transaction model instance (S). In task box B, The I-CSCF entity 4 performs Home Subscriber Server (HSS) interrogation and prepares the Invite to be forwarded to the next hop, as per prior art. This next hop is, in this example, S-CSCF(B) 6. So, the Invite that would be sent from the I-CSCF entity 4 would have a Route header containing the S-CSCF(B) 6 domain name. In task box D, the I-CSCF entity 4 determines that the upstream server, S-CSCF(A) 2 in this example, supports Pivot routing. The I-CSCF entity 4 will therefore send a 320 Pivot routing response to S-CSCF(A) 2. In this example, the 320 Pivot routing contains the information that S-CSCF(A) 2 needs to construct the Invite request that shall be sent to the destination that was determined by the I-CSCF entity 4, viz. S-CSCF(B) 6. In addition, the 320 Pivot routing contains the R-URI that shall be used by S-CSCF(A) 2 for forwarding the Invite. This allows that the I-CSCF entity 4 may modify the R-URI, e.g. change from SIP:URI to Tel:URI. S-CSCF(A) 2 responds with Ack on the 320 response, which is normal for non-2xx final response. Herein non-2xx response means a SIP response having a status code value outside the range 200-299. The sending of Ack by S-CSCF(A) 2 leads to destroying by S-CSCF(A) 2 of its client transaction model instance C1. The receiving of Ack by the I-CSCF entity 4 leads to destroying by the I-CSCF entity 4 of its server transaction model instance S. Reliable transmission (e.g. Transmission control Protocol (TCP)) is assumed in this example.

The I-CSCF entity 4, after having destroyed its server transaction model instance S, closes the server process. Hence, the I-CSCF entity 4 is no longer part of the SIP transaction, and can be used for other SIP transactions.

In task box E, S-CSCF(A) 2 prepares the new Invite request, using the information received from the I-CSCF entity 4 in the 320 Pivot routing. In this example, Max-Forwards will be decremented by 1. S-CSCF(A) 2 is now ready to send the Invite request to S-CSCF(B) 6, according to normal SIP server routing rules. The downstream forwarding of the Invite will not traverse the I-CSCF entity 4. In this example, S-CSCF(A) 2 uses its own address to set the Via header in the Invite to S-CSCF(B) 6.

When the I-CSCF entity 4 contacts the HSS, it may receive information from the HSS that the I-CSCF entity 4 shall place in the downstream Invite. Example of such information includes HSS address, which may be carried in the Proxy-User-Database SIP header. In the case of pivot routing between the I-CSCF entity 4 and S-CSCF(A) 2, the I-CSCF entity 4 preferably includes such information, if received from HSS, in the 3xx pivot request. S-CSCF(A) 2 can then include the information in the Invite towards S-CSCF(B) 6, in the same manner as it includes other information received in the 3xx pivot request in the Invite towards S-CSCF(B) 6.

From this point of the SIP transaction onwards, regular SIP routing takes place from S-CSCF(A) 2 downstream. S-CSCF (A) 2 sends Invite to S-CSCF(B) 6 according to normal signaling method. S-CSCF(A) 2 spawns again an Invite client transaction model instance, C2. S-CSCF(B) 6 will, in task box F, determine the next hop etc.

FIG. 1 shows an example sequence (181, 180, 200). Different sequences are also possible, e.g. multiple early SIP dialogues may be established for early media transport or due to SIP forking. These provisional responses do not traverse the I-CSCF entity 4.

In the case of a non-2xx final response from S-CSCF(B) 6, the Ack that is generated by S-CSCF(A) 2 forms part of the same transaction as the Invite. This Ack will, however, not traverse the I-CSCF entity 4, since S-CSCF(A) 2 had sent the Invite directly to S-CSCF(B) 6. Likewise, if the calling party cancels the call establishment, the Cancel request, the 200 Ok for this Cancel request and the resulting 487 Cancelled response on the Invite do not traverse the I-CSCF entity 4.

For the sending of a SIP Invite from an S-CSCF entity to a Breakout Gateway Control Function (BGCF) entity or from a BGCF entity to an I-CSCF entity, the same mechanism can be applied as described above. Hence, the BGCF entity may apply Pivot routing to the S-CSCF entity, after the BGCF entity has determined the next hop for the Invite. The BGCF entity may in such case have to provide the preceding S-CSCF entity with information that the BGCF entity has received from a Number portability database, such as the 'cic' parameter (Carrier Identification Code) and the 'dai' parameter (Dial Around Indicator); this information is meant for inclusion, by the S-CSCF entity, in the R-URI having Tel:URI format.

The method as described thus far, provides the advantage that Invite transaction client state models and server state models may be released as soon as they are no longer required. Hence, this method may result in saving on system capacity for entities such as I-CSCF entities and BGCF entities, but also S-CSCF entities and SIP-AS's.

It is noted that it is known that only a User Agent Server (UAS) may return a 305 Use Proxy response in response to a message. Hereby this UAS requests the User Agent Client (UAC) that originated the message to route the message through a proxy. The UAC will then route the message through a proxy, resulting in that the message will again be transmitted to this UAS, this time through a proxy, as requested by the UAS. According to the present invention, however, a proxy may return a 3xx response, such as a 320 response (let the 320 response be the pivot request). Hereby this proxy requests the upstream proxy to route the message through a proxy. The upstream proxy will then route the message through a proxy as requested. This time, the message will not arrive at the proxy that returned the 320 response again. Instead, the message will be sent directly to the proxy or UAS that was determined by the proxy that returned 320 as being the next hop or end-point.

It will thus be appreciated that the pivot route request submitted to the immediate upstream proxy by the pivot requesting proxy and signalling towards that immediate upstream proxy that that upstream proxy shall assume the responsibility of sending the SIP Invite to a next hop determined by the pivot requesting proxy instead of the pivot requesting proxy sending the SIP Invite to said next hop, is not to be confused with a re-targeting request for the UAC as transmitted by a UAS.

In the foregoing specification, the invention has been described with reference to specific examples of embodiments of the invention. It will, however, be evident that various modifications and changes may be made therein without departing from the broader spirit and scope of the invention as set forth in the appended claims.

In the examples the first node is a S-CSCF entity, the second node, i.e. proxy, is an I-CSCF entity and the third node is a S-CSCF entity. It will be appreciated that the invention may also be practised with other SIP network nodes acting as the second node proxy. It is possible that the first node is a UA, the second node is a P-CSCF entity and the third node is a S-CSCF entity. It is also possible that the first node is a P-CSCF entity, the second node is a S-CSCF entity and the third node is an I-CSCF entity. It is also possible that the first node is an I-CSCF entity, the second node is a S-CSCF entity and the third node is a P-CSCF entity. It is also possible that the first node is a S-CSCF entity, the second node is a P-CSCF entity and the third node is a UA.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method of performing a Session Initiation Protocol transaction in a Session Initiation Protocol based communications network from a first node to a third node via a second node, comprising:
    receiving a Session Initiation Protocol message at the second node from the first node, wherein the second node acts as a Session Initiation Protocol proxy;
    transmitting a request from the second node to the first node requesting that the first node take over responsibility of the transaction and forward the message directly to the third node, wherein the second node originates the request to the first node;
    forwarding the message from the first node directly to the third node in response to receiving said request; and
    wherein during the remainder of the Session Initiation Protocol transaction, exchanging further Session Initiation Protocol messages directly between the first node and the third node without traversing the second node.

2. The method according to claim 1, wherein upon receiving the request, the first node modifies the message prior to forwarding the message to the third node on the basis of information associated with the third node included in the request.

3. The method according to claim 1, wherein the first node indicates to the second node that the first node is arranged to receive the request, to forward the message to the third node in response to the request, and to take over responsibility of the transaction.

4. The method according to claim 1, wherein:
    the Session Initiation Protocol based communications network is an Internet protocol Multimedia Subsystem communications network,
    the second node is one of an Interrogating Call Session Control Function entity and a Breakout Gateway Control Function entity, and
    the first node acts as one of a non-record routing proxy, a record routing proxy entity, a Back-to-Back User Agent such as a Proxy Call Session Control Function entity, a Serving Call Session Control Function entity, and a Session Initiation Protocol Application Server.

5. The method according to claim 1, wherein the request has the form of a Session Initiation Protocol 3xx response with a status code value in the range of 300 to 399.

6. A system for performing a SIP transaction in a Session Initiation Protocol based communications network, comprising:
a first node comprising a first input/output device for transmitting and receiving messages and requests;
a second node comprising a second input/output device for transmitting and receiving messages and requests;
wherein the first node is arranged to transmit via the first input/output device to the second node a SIP message that is to be forwarded to a recipient node;
wherein the second node acts as a SIP proxy arranged to receive the SIP message from the first node and is arranged to transmit via the second input/output device a request to the first node requesting the first node to take over responsibility of the transaction and to forward the message directly to the recipient node, wherein the second node originates the request to the first node;
wherein the first node is arranged to forward the message directly to the recipient node in response to the request; and
wherein the first node is arranged to transmit further Session Initiation Protocol messages directly to the recipient node and is arranged to receive further Session Initiation Protocol messages directly from the recipient node during the remainder of the SIP transaction without the further messages traversing the second node.

7. A network node for acting in a Session Initiation Protocol transaction in a Session Initiation Protocol based communications network, comprising:
a processor operationally coupled to an input/output device, wherein the processor is configured to:
receive from a sending node via the input/output device a Session Initiation Protocol message that is to be forwarded to a recipient node, wherein the network node acts as a Session Initiation Protocol proxy; and
transmit via the input/output device a request to the sending node requesting the sending node to take over responsibility of the transaction and to forward the message and further Session Initiation Protocol messages during a remainder of the Session Initiation Protocol transaction directly to the recipient node without traversing the network node, wherein the request to the sending node originates at the network node.

8. The network node according to claim 7, wherein the request comprises information associated with the recipient node.

9. The network node according to claim 7, wherein the network node is one of an Interrogating Call Session Control Function entity and a Breakout Gateway Control Function entity.

10. The network node according to claim 7, wherein the request has the form of a Session Initiation Protocol 3xx response having a status code value in the range of 300 to 399.

11. A network node for acting in a Session Initiation Protocol transaction in a Session Initiation Protocol based communications network, the network node comprising:
a processor operationally coupled to an input/output device, wherein the processor is configured to:
transmit via the input/output device to a forwarding node a SIP message that is to be forwarded to a recipient node, wherein the forwarding node acts as a Session Initiation Protocol proxy;
receive via the input/output device from the forwarding node a request that the network node take over responsibility of the transaction and to directly forward the message to the recipient node, wherein the request originates at the forwarding node;
forward the message directly to the recipient node in response to the request; and
transmit further Session Initiation Protocol messages directly to the recipient node and receive further Session Initiation Protocol messages from the recipient node during the remainder of the Session Initiation Protocol transaction without traversing the forwarding node.

12. The network node according to claim 11, wherein the request includes information associated with the recipient node.

13. The network node according to claim 12, wherein the network node is arranged to modify the message prior to forwarding the message to the recipient node on the basis of the information associated with the recipient node.

14. The network node according to claim 11, wherein the network node is arranged to indicate to the forwarding node that the network node is arranged to receive the request and in response to the request forward the message to the recipient node without traversing the second node.

15. The network node according to claim 11, wherein the network node acts as one of a non-record routing proxy, a record routing proxy or as Back-to-Back User Agent such as a Proxy Call Session Control Function entity, a Serving Call Session Control Function entity, and a Session Initiation Protocol Application Server.

16. The network node according to claim 11, wherein the request has the form of a Session Initiation Protocol 3xx response having a status code value in the range of 300 to 399.

* * * * *